United States Patent
Perry et al.

(10) Patent No.: US 10,471,508 B2
(45) Date of Patent: Nov. 12, 2019

(54) ADDITIVE MANUFACTURING WITH LASER ENERGY RECYCLING

(71) Applicant: GM GLOBAL TECHNOLOGY OPERATIONS LLC, Detroit, MI (US)

(72) Inventors: Thomas A. Perry, Bruce Township, MI (US); Blair E. Carlson, Ann Arbor, MI (US); Jason J. Nolte, Wixom, MI (US); Hyungmin Chae, Novi, MI (US); John Patrick Spicer, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 253 days.

(21) Appl. No.: 15/471,868

(22) Filed: Mar. 28, 2017

(65) Prior Publication Data

US 2018/0281065 A1    Oct. 4, 2018

(51) Int. Cl.
*B22F 3/105* (2006.01)
*B33Y 10/00* (2015.01)
(Continued)

(52) U.S. Cl.
CPC ........ *B22F 3/1055* (2013.01); *B23K 26/0604* (2013.01); *B23K 26/0643* (2013.01); *B23K 26/0648* (2013.01); *B23K 26/0676* (2013.01); *B23K 26/082* (2015.10); *B23K 26/342* (2015.10); *B23K 26/702* (2015.10); *B29C 64/153* (2017.08); *B29C 64/35* (2017.08); *B29C 64/386* (2017.08); *B33Y 10/00* (2014.12); *B33Y 30/00* (2014.12); *B33Y 40/00* (2014.12);
(Continued)

(58) Field of Classification Search
CPC ............... B22F 3/1055; B22F 2998/10; B22F 2003/1057; B29C 64/35; B29C 64/386; B29C 64/153; B23K 26/0643; B23K 26/702; B23K 26/0648; B23K 26/0604; B23K 26/082; B23K 26/342; B23K 26/0676; B33Y 40/00; B33Y 50/02; B33Y 30/00; B33Y 10/00; Y02P 10/295; B29K 2105/251
See application file for complete search history.

(56) References Cited

U.S. PATENT DOCUMENTS 8,101,846 B1 * 1/2012 Schroeder ............... H01L 35/30
                                                        136/200
9,308,583 B2   4/2016 El-Dasher et al.
(Continued)

*Primary Examiner* — Jessee R Roe
*Assistant Examiner* — Rebecca Janssen
(74) *Attorney, Agent, or Firm* — Lorenz & Kopf, LLP

(57) ABSTRACT

Additive manufacturing systems, area scanning laser systems, and methods for performing an additive manufacturing process are provided. An exemplary additive manufacturing system includes a laser generation device for producing a laser beam. Further, the additive manufacturing system includes an optic element for forming a first portion of the laser beam with a first polarization and a second portion of the laser beam with a second polarization different from the first polarization to encode an image in the laser beam. Also, the additive manufacturing system includes a selective beam separator configured to direct the first portion of the laser beam onto a material to be sintered or melted. The additive manufacturing system includes a recycling system for receiving the second portion of the laser beam.

10 Claims, 3 Drawing Sheets

(51) Int. Cl.
*B33Y 40/00* (2015.01)
*B33Y 30/00* (2015.01)
*B33Y 50/02* (2015.01)
*B23K 26/342* (2014.01)
*B23K 26/082* (2014.01)
*B23K 26/067* (2006.01)
*B23K 26/06* (2014.01)
*B23K 26/70* (2014.01)
*B29C 64/153* (2017.01)
*B29C 64/386* (2017.01)
*B29C 64/35* (2017.01)
*B29K 105/00* (2006.01)

(52) U.S. Cl.
CPC ....... *B33Y 50/02* (2014.12); *B22F 2003/1057* (2013.01); *B22F 2998/10* (2013.01); *B29K 2105/251* (2013.01); *Y02P 10/295* (2015.11)

(56) References Cited

U.S. PATENT DOCUMENTS

| | | | |
|---|---|---|---|
| 2016/0129503 A1 | 5/2016 | El-Dasher et al. | |
| 2016/0243652 A1 | 8/2016 | El-Dasher et al. | |
| 2017/0126150 A1* | 5/2017 | Wang | B64C 39/024 |
| 2017/0232637 A1* | 8/2017 | DeMuth | B33Y 50/02 |
| | | | 264/497 |

* cited by examiner

ADDITIVE MANUFACTURING WITH LASER ENERGY RECYCLING

INTRODUCTION

The present disclosure generally relates to additive manufacturing, and more particularly relates to additive manufacturing utilizing area scanning by laser beams.

New technology for additive manufacturing (AM) of metal or non-metal parts may radically improve processing speed to the point that additive manufacturing could become commercially viable for the production of high volume parts. Current powder-bed additive manufacturing systems typically work by depositing a thin layer of powder onto a build zone, and then selectively sintering or melting the powder to a solid layer by rastering a directed energy source (often a point focused laser) over the cross-section of the part.

Area scanning is a new advance in additive manufacturing that improves the time required to sinter or melt each individual layer by replacing the point focused laser with a high power laser image of a relatively large sub-area of the part's cross-section. Each layer of the part can be created by stitching together some number of sub-areas. Based on available laser technology, each sub-area may currently be from about 5 mm×5 mm up to about 75 mm×75 mm. This is a dramatic gain over a scanned point focus which is likely to be a spot on the order of about 0.1 mm diameter.

Area scanning is accomplished by controlling the polarization of the incident laser radiation using a custom made nonlinear optic element. The source of the laser power is naturally monochromatic, coherent, and plane polarized. For purposes of this description the plane of polarization will be assumed to be vertical. The custom made nonlinear optic element may include a DC bias source, transparent electrodes, a photoconductive coating (active in the blue portion of the spectrum), and a nonlinear material that retards the polarization of light when a static electric field is applied. Radiation from the polarized laser is directed onto the nonlinear optic element exactly coincident with an image of the sub-area of the part cross section that is to be printed. The image of the subarea is formed by projecting a blue light source through a digital light projection (DLP) optic element. Regions of the image that are illuminated blue will cause the photoconductive layer to conduct, which will in turn apply potential to the nonlinear optic element in such a way that the polarization of light passing through the nonlinear optical material in those regions is retarded. In regions that are not illuminated with blue, the nonlinear optical material passes all light with no change in polarization. The thickness of the nonlinear material is chosen so that the retardation is one half wavelength of the laser radiation, this has the effect of selectively rotating the incident polarization from vertical to horizontal.

The laser light exiting the nonlinear optic element is incident on a dielectric mirror that is strongly polarization dependent. As a result, the vertical polarization will be separated from the horizontal polarization and may be used to sinter or melt the powder and make the part. In order for the powder to sinter or melt, the grains of powder must be exposed to a similar quantity of energy as with a scanning point focused laser system, those systems use 200-500 W lasers and 10's of mm/S scanning speeds. To achieve similar energy densities using the large area technology the laser power needs to be in the 5-100 KW range and the laser interaction time needs to be 10's of mS per zone. To achieve these high powers in practice, multiple lower power lasers (~1 KW each) are combined using a beam homogenizing element. The amount of energy deposited in the part in each shot varies dramatically depending on the cross-section of the part and will range from a few percent to 100 percent. This means that a significant fraction of the 5-100 KW laser is not used in the additive manufacturing process but instead is deposited in a chilled beam dump of some sort.

Accordingly, it is desirable to provide a system for recycling laser power in an additive manufacturing system. In addition, it is desirable to provide methods for reducing waste in additive manufacturing processes. Furthermore, other desirable features and characteristics will become apparent from the subsequent detailed description and the appended claims, taken in conjunction with the accompanying drawings and the introduction.

SUMMARY

Additive manufacturing systems, area scanning laser systems, and methods for performing an additive manufacturing process are provided. An exemplary additive manufacturing system includes a laser generation device for producing a laser beam. Further, the additive manufacturing system includes an optic element for forming a first portion of the laser beam with a first polarization and a second portion of the laser beam with a second polarization different from the first polarization to encode an image in the laser beam. Also, the additive manufacturing system includes a selective beam separator configured to direct the first portion of the laser beam onto a material to be sintered or melted. The additive manufacturing system includes a recycling system for receiving the second portion of the laser beam.

Another embodiment provides an area scanning laser system. The area scanning laser system includes a laser processing system for forming a first portion of a laser beam with a first polarization and a second portion of the laser beam with a second polarization different from the first polarization to encode an image in the laser beam. Also, the area scanning laser system includes a build chamber for receiving a material to be sintered or melted and the first portion of the laser beam for sintering or melting the material. Further, the area scanning laser system includes a recycling system for receiving the second portion of the laser beam and for recycling the radiant energy in the second portion of the laser beam.

In another embodiment, a method for performing an additive manufacturing process includes producing a laser beam. The method forms a first portion of the laser beam with a first polarization and a second portion of the laser beam with a second polarization different from the first polarization to encode an image in the laser beam. Further, the method includes directing the first portion of the laser beam onto a material to be sintered or melted. Also, the method includes recycling the second portion of the laser beam.

BRIEF DESCRIPTION OF THE DRAWINGS

The present subject matter will hereinafter be described in conjunction with the following drawing figures, wherein like numerals denote like elements, and wherein.

DETAILED DESCRIPTION

The following detailed description is merely exemplary in nature and is not intended to limit the subject matter claimed herein. Furthermore, there is no intention to be bound by any theory presented in the preceding background or the following detailed description.

Embodiments herein provide for the use of laser power in additive manufacturing. More specifically, embodiments herein provide for area scanning of laser power. Such area scanning provides for projection of an image onto a layer of material, such as powder, for example, metal or non-metal powders, to sinter or melt the material to form a layer of an article to be manufactured. In processing a laser beam to form the image, a non-selected portion of the laser is not directed onto the layer of powder, and is otherwise heretofore unused. Embodiments herein provide for processing the non-selected portion of the laser for further use either within or outside the additive manufacturing process. As a result, embodiments herein may improve the efficiency of additive manufacturing systems by recovering laser energy. Waste energy from a laser based additive manufacturing system may be recovered either by using a thermoelectric generator or by "recycling" the dumped laser beam back into the process. Therefore, operating costs of high productivity additive manufacturing systems may be reduced.

Embodiments herein allow for additive manufacturing using a very high power operated at 100% output and that selectively passes a fraction of the total power to a powder bed to sinter or melt and form complex three dimensional parts. The residual power not used to sinter or melt is recycled to make the process more efficient and cost effective. Embodiments may be employed in high volume additive process and take advantage of the high throughput capability of area scanning laser systems by eliminating any delay due to laser interruption during powder re-coating required by point focused laser methods. While embodiments described herein are based on processing metals, embodiments herein may be used in systems manufacturing metal parts, plastic parts, or ceramic parts.

Figure 1:
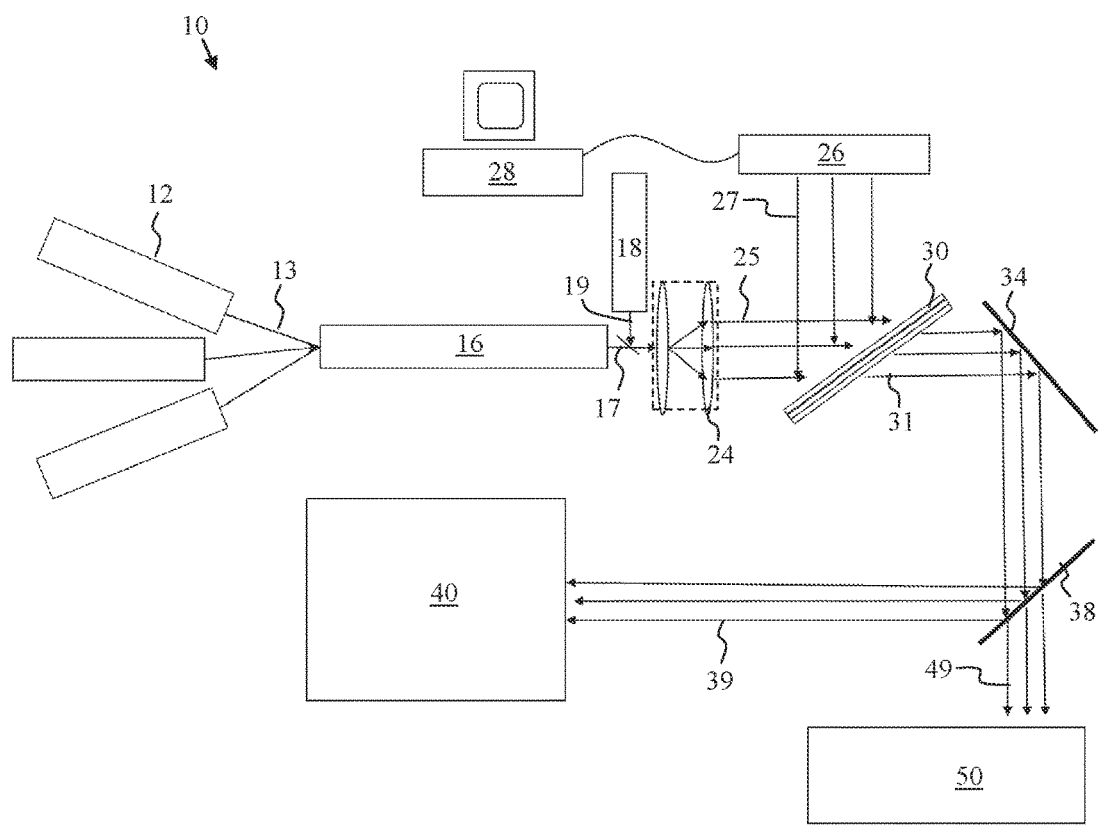
FIG. 1 is a schematic diagram of an additive manufacturing system provided with a recycling system for recycling laser power in accordance with an embodiment herein.

FIG. 1 is a schematic diagram illustrating an additive manufacturing system 10. As shown, the additive manufacturing system 10 includes a laser generator 12, such as a continuous wave (CW) laser generator 12, for generating a laser beam 13, such as a continuous wave laser beam 13. In an exemplary embodiment, the additive manufacturing system 10 includes a plurality of high power laser generators 12 for generating a plurality of laser beams 13. In an exemplary embodiment, the laser generators 12 may generate laser beams at a power of from about 5 to about 100 kilowatts (kW).

As shown, the additive manufacturing system 10 includes a beam homogenizer 16. The laser beams 13 are received as an input to the beam homogenizer 16. Beam homogenizer 16 collects and homogenizes the inputted laser beams 13. As a result, beam homogenizer 16 creates and outputs a larger homogenized beam 17 from the plurality of laser beams 13. In an exemplary embodiment, the homogenized beam 17 has a square cross-section.

Further, the additive manufacturing system 10 includes a pulsed laser generator 18. The pulsed laser generator 18 generates a pulsed laser beam 19 that is introduced into the homogenized beam 17. The pulsed laser beam 19 may be of medium power and used to control sintering or melting in the build chamber. In an exemplary embodiment, the pulsed laser beam 19 has a power of from about 0.1 to about 2 Joules per pulse with from about 0.1 to about 2 hertz (Hz) repetition rate.

The additive manufacturing system 10 includes a collimator 24. As shown, the homogenized beam 17 and pulsed laser beam 19 form a process beam that is received by a collimator 24. Collimator 24 forms a collimated light beam 25 from the homogenized beam 17 and pulsed laser beam 19.

In FIG. 1, the additive manufacturing system 10 also includes a modulation device 26 configured to modulate the collimated light beam 25 to present a desired image. Specifically, the image of the area to be sintered or melted is projected by the modulation device 26. An exemplary modulation device 26 is a light projector, such as a digital light projection (DLP) system for projecting an image 27. In an exemplary embodiment, the image 27 is projected with light of a selected wavelength, such as blue light. The modulation device 26 may be controlled by a computer 28, as shown, to project a selected image 27.

The additive manufacturing system 10 includes a nonlinear optic element 30 that receives the collimated light beam 25 and image 27. The portion of the collimated light beam 25 overlapping with the image 27 may be considered to be a selected portion of the collimated light beam 25. The portion of the collimated light beam 25 that does not overlap with the image 27 may be considered to be a non-selected portion of the collimated light beam 25. In an exemplary embodiment, the nonlinear optic element 30 polarizes the selected portion of the collimated light beam 25 to a first polarization, e.g., "s-polarization", and polarizes the non-selected portion of the collimated light beam 25 to a second polarization, e.g., "p-polarization", different from the first polarization. As a result, the nonlinear optic element 30 forms an image-encoded beam 31. Specifically, the image 27 is encoded in light of s-polarization. In an exemplary embodiment, the s-polarization is perpendicular to the p-polarization.

As shown, the additive manufacturing system 10 includes a mirror 34 and a selective mirror 38. An exemplary selective mirror 38 is a dielectric mirror that reflects light of one polarization and allows light of another polarization to pass through. Further, the selective mirror 38 may reflect a partial amount of light to provide gray scale valuations at selected pixels of the image.

In FIG. 1, the image-encoded beam 31 is completely reflected by a mirror 34. Then, a portion 39 of the image-encoded beam 31 is selectively reflected by the selective mirror 38 and a portion 49 of the image-encoded beam 31 passes through the selective mirror 38. Specifically, the s-polarization portion of the beam 31, in which the image 27 is encoded, is reflected by the selective mirror 38, to form a sintering or melting beam 39. The p-polarization portion of the beam 31, which includes the non-selected portion of the beam, passes through the selective mirror 38.

The additive manufacturing system 10 includes a build chamber 40. The build chamber 40 includes a powder heater and a build plate on which powder is positioned for the additive manufacturing process. As shown in FIG. 1, the image beam 39 is received on powder located over the build plate and sinters or melts the powder in the shape of the image encoded in the image beam 39.

As described herein, the additive manufacturing system 10 is provided with a recycling system 50. The recycling system 50 receives the portion 49 of the image-encoded beam 31 that passes through the selective mirror 38, i.e., the non-selected portion of the image-encoded beam 31. As described below, the recycling system 50 processes the non-selected portion 49 of the image-encoded beam 31 to utilize the energy therein.

Figure 2:
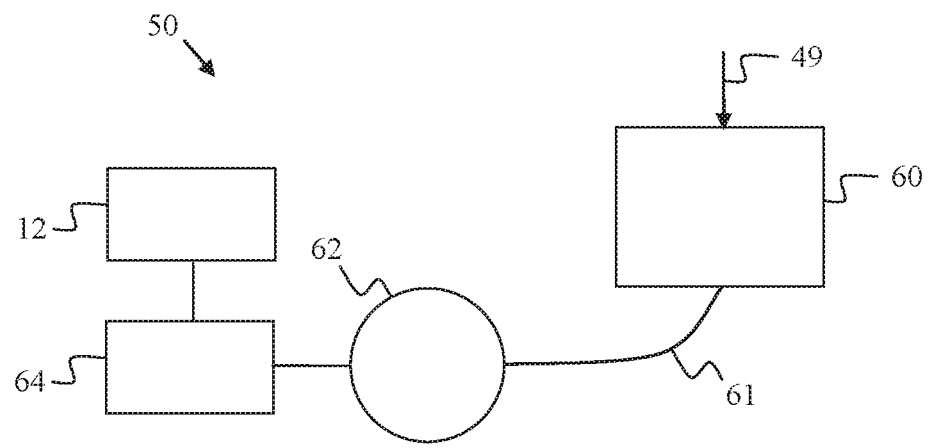
FIG. 2 is a schematic view of an embodiment of the recycling system for recycling laser power of FIG. 1.

FIG. 2 is a schematic diagram illustrating an embodiment of the recycling system 50 from FIG. 1. In FIG. 2, the recycling system 50 includes a thermoelectric generator 60. As is well known, a thermoelectric generator 60 may include a thermoelectric material that converts the radiant energy of the laser beam to thermal energy and to electric energy. Therefore, the thermoelectric generator 60 may receive the non-selected portion 49 of the image-encoded beam and convert the laser's radiant energy to thermal energy, then to electric energy. The electric energy 61 may then be processed. For example, the electric energy 61 in direct current form may be fed from the thermoelectric generator 60 to a power inverter 62 and then used locally to power the laser generators 12 of FIG. 1, such as through a common bus 64 for the laser generators 12. Alternatively, the power converted at the inverter 62 could be sold back to the power utility or used outside of the additive manufacturing system 10 of FIG. 1.

Figure 3:
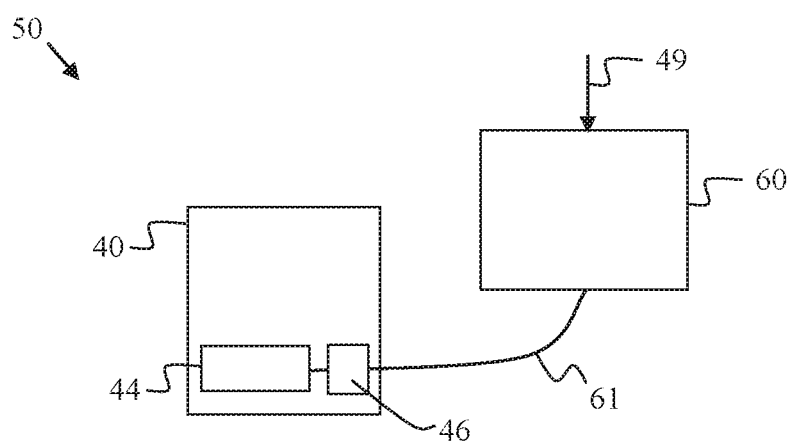
FIG. 3 is a schematic view of another embodiment of the recycling system for recycling laser power of FIG. 1.

FIG. 3 is a schematic diagram illustrating another embodiment of the recycling system 50 from FIG. 1. In FIG. 3, the recycling system 50 again includes a thermoelectric generator 60. As shown, the thermoelectric generator 60 receives the non-selected portion 49 of the image-encoded beam and converts the laser energy to thermal energy, then to electric energy. The thermoelectric generator 60 transfers electric energy 61 from the non-selected portion 49 of the image-encoded beam to a component 44 of the build chamber 40 of the additive manufacturing system 10 of FIG. 1. For example, the component 44 may be a build plate 44 on which powder layers are positioned for sintering or melting to form the article to be manufactured. As shown, the energy 61 may be directed to a temperature controller 46 to maintain the build plate 44 at the desired constant temperature. Alternatively, the component 44 may be a powder heater for heating the powder to be deposited in layers over the build plate. As shown, the electric energy 61 may be directed to a temperature controller 46 to maintain the powder heater 44 at the desired constant temperature. In either case, the waste energy in the non-selected portion 49 of the image-encoded beam is used to supplement heat supplied to the build chamber 40 and, hence, to control the overall temperature of the build chamber 40.

Figure 4:
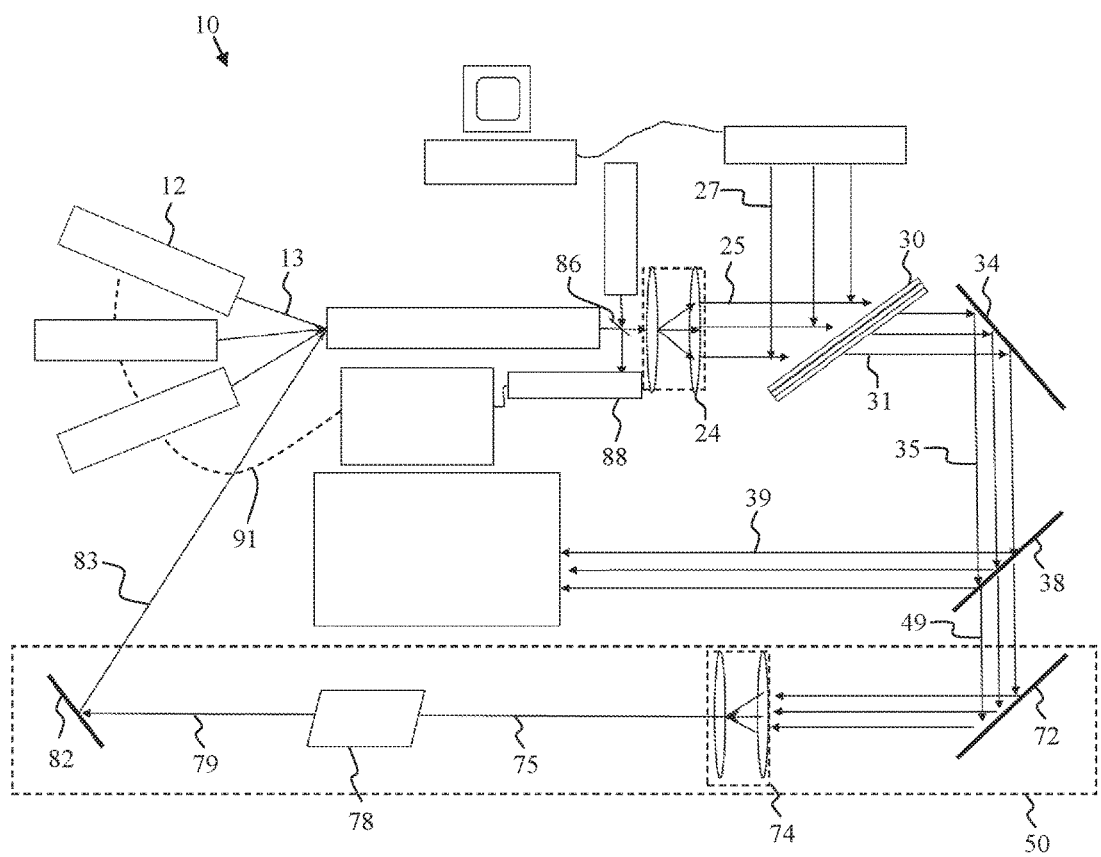
FIG. 4 is a schematic diagram of an additive manufacturing system provided with another embodiment of a recycling system for recycling laser power.

FIG. 4 is a schematic diagram illustrating another embodiment in which the recycling system 50 is coupled to the additive manufacturing system 10 to reduce energy waste. In the embodiment of FIG. 4, the laser's radiant energy itself is recycled and used in the sintering/melting process of the additive manufacturing system 10. In other words, the radiant energy from the portion 49 of the laser that enters the recycling system 50 is not converted to thermal and electric energy, but, rather, is utilized as radiant energy in the form of a laser beam, albeit a further processed laser beam. In FIG. 4, the recycling system 50 includes a mirror 72 that reflects the non-selected portion 49 of the image-encoded beam. The exemplary recycling system 50 further includes a collimator 74 that receives the non-selected portion 49 of the image-encoded beam to form a collimated light beam 75.

As shown, the recycling system 50 also includes a polarization manipulation device 78, such as an optical wave plate. In an exemplary embodiment, the recycling system includes a half wave plate as the polarization manipulation device 78. The polarization manipulation device 78 may utilize a phase delay to convert the collimated light beam 75 from light having p-polarization to light having s-polarization to form a manipulated beam 79. As shown, a mirror 82 may be used to direct the manipulated beam as an input beam 83 to the beam homogenizer 16 along with the other input laser beams 13.

For the sintering/melting process to work well, the power incident on the nonlinear optic element 30 must be constant. The added power of the input beam 83 may degrade the quality of the build in the build chamber 40. Thus, the additive manufacturing system 10 must be actively adjusted to take the additional power into account. The additive manufacturing system 10 uses a combination of two laser sources, i.e., the laser generators 12 and the pulsed laser generator 18.

In the embodiment of FIG. 4, a beam splitter 86 is located downstream of the beam homogenizer 16 and upstream of the nonlinear optic element 30. The beam splitter 86 directs a small fraction, such as from about 0.001% to about 0.05%, for example about 0.01%, of the process beam onto a detection element 88, such as a photodetector. The process beam includes the homogenized beam 17 and the pulsed beam 19. In an exemplary embodiment, the pulsed energy forms about 10% of the energy of the process beam.

The photodetector 88 communicates a signal value representative of the process beam to a closed loop laser feedback control circuit 90. The closed loop laser feedback control circuit 90 provide a control signal 91 to adjust the power of the main laser generators 12. The timing of when the laser power is measured and when the pulsed laser generator 18 fires may be controlled because the image of the area to be sintered or melted must be projected by the DLP 26 first, the power after the homogenizer 16 must be measured and adjusted to a constant value, and the power adjustment circuit must be disabled before the pulsed laser generator 18 is fired. The repetition rate of the pulse laser may be as high as about 100 Hz. The feedback circuit will be enabled immediately when each image from the DLP is projected and will stay active for 90% of the time between pulses. At the end of this time, the power output of the laser generators will be fixed and the feedback circuit will be disable during the pulse firing.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the claimed subject matter in any way. Rather, the foregoing detailed description will provide those skilled in the art with a convenient road map for implementing an exemplary aspect of the subject matter. It being understood that various changes may be made in the function and arrangement of elements described in an exemplary aspect without departing from the scope of the subject matter as set forth in the appended claims.

What is claimed is:
1. An additive manufacturing system comprising:
a laser generation device for producing a laser beam;
an optic element for forming a first portion of the laser beam with a first polarization and a second portion of the laser beam with a second polarization different from the first polarization to encode an image in the laser beam;
a selective beam separator configured to direct the first portion of the laser beam onto a material to be sintered or melted;
a recycling system for receiving the second portion of the laser beam from the selective beam separator; and
a build chamber including a build plate, wherein the recycling system comprises a thermoelectric generator configured to convert energy from the laser beam to electric energy, and wherein the electric energy is directed to the build plate to heat the build plate.

2. The additive manufacturing system of claim 1 wherein the recycling system comprises an inverter coupled to the thermoelectric generator.

3. The additive manufacturing system of claim 1 wherein the recycling system comprises:
an inverter coupled to the thermoelectric generator; and
a power bus coupled to the inverter and to the laser generation device to provide power to the laser generation device.

4. The additive manufacturing system of claim 1 wherein the build chamber further comprises a material heater, and wherein the electric energy is directed to the material heater to heat the material heater.

5. An area scanning laser system comprising:
a laser processing system for forming a first portion of a laser beam with a first polarization and a second portion of the laser beam with a second polarization different from the first polarization to encode an image in the laser beam;
a build chamber for receiving a material to be sintered or melted and the first portion of the laser beam for sintering or melting the material, wherein the build chamber includes a material heater; and
a recycling system for receiving the second portion of the laser beam and for recycling radiant energy in the second portion of the laser beam, wherein the recycling system comprises a thermoelectric generator configured to convert the radiant energy from the laser beam to electric energy, and wherein the electric energy is directed to the material heater to heat the material heater.

6. The area scanning laser system of claim 5 wherein the recycling system comprises:
a thermoelectric generator configured to convert the radiant energy from the laser beam to electric energy;
an inverter coupled to the thermoelectric generator; and
a power bus coupled to the inverter and to the laser processing system.

7. The area scanning laser system of claim 5 wherein the build chamber further comprises a build plate, and wherein the electric energy is directed to the build plate to heat the build plate.

8. A method for performing an additive manufacturing process comprising:
producing a laser beam;
forming a first portion of the laser beam with a first polarization and a second portion of the laser beam with a second polarization different from the first polarization to encode an image in the laser beam;
directing the first portion of the laser beam from a selective mirror directly onto a material to be sintered or melted;
directing the second portion of the laser beam from the selective mirror directly to a thermoelectric generator; and
recycling the second portion of the laser beam with the thermoelectric generator.

9. The method of claim 8 wherein the material to be sintered or melted is located in a build chamber including a build plate and wherein recycling the second portion of the laser beam with the thermoelectric generator comprises converting energy from the laser beam to electric energy and directing the electric energy to the build plate to heat the build plate.

10. The method of claim 8 wherein the material to be sintered or melted is located in a build chamber including a material heater and wherein recycling the second portion of the laser beam with the thermoelectric generator comprises converting energy from the laser beam to electric energy and directing the electric energy to the material heater to heat the material heater.

* * * * *